United States Patent Office 3,455,855

Patented July 15, 1969

3,455,855

SILK SCREENABLE PROTECTIVE CONFORMAL COATINGS FOR PRINTED CIRCUITS

Russell M. Houghton and Wilbur R. McElroy, Olean, N.Y., assignors to CONAP Inc., Allegany, N.Y.

No Drawing. Filed Oct. 22, 1965, Ser. No. 502,615
Int. Cl. C08g *41/00;* H05k *3/00;* B41m *3/08*
U.S. Cl. 260—18 4 Claims

ABSTRACT OF THE DISCLOSURE

A thixotropic conformal coating composition suitable for application by silk screening in precise designs and curing without substantial flow is made by mixing in a solvent (1) an isocyanate component containing a portion of free toluylene diisocyanate monomer and a portion of an adduct of one mole of a polyol with two moles of toluylene diisocyanate and (2) a castor oil derived polyol admixed with a portion of a hindered aromatic diamine. If desired, the several ingredients of parts (1) and (2) may be supplied to the reaction separately since they need not be precombined in the manner indicated, though such precombining is preferable.

This invention relates to polyurethane-urea coatings which have outstanding electrical properties and which can be applied to printed circuit boards or other substrates by the process known as silk screening whereby a conformal coating is applied in a specific pattern and the coating undergoes subtsantially no flow during the curing cycle but conforms to the surface area where it is applied. In particular, this invention relates to thixotropic polyurethane-urea coating compositions which are especially useful in application by silk screening and which experience substantially no flow when cured at elevated temperature.

The polyurethane-urea coating composition is made by mixing and reacting an isocyanate-bearing component with a component consisting of a mixture of a polyol and a hindered aromatic diamine.

It is known to react isocyanates with all types of polyols and primary and secondary diamines. Generally when these reactions occur at room temperature, a gradual increase in viscosity is observed, and as the mixture thickens, it becomes sticky and stringy and completely unsuitable for silk screening. However, it has been found unexpectedly that when the coating systems of this invention are made in the manner set forth, a smooth, buttery, non-sag and non-stringing material ideally suited to silk screening is obtained, and when applied to a substrate in a film, it does not flow substantially, i.e., beyond tolerable limits, upon heating to elevated temperature to effect a cure.

Another unexpected result which accrues according to the teachings of this invention is that the coating systems, when prepared according to the techniques herein described, develop thixotropic characteristics which are highly important, if not in fact essential, in polyurethane-urea systems, well suited to silk screening operations, especially where the outline of the pattern which is produced on the substrate is critical. An indication of the degree of thixotropy is obtained by determining the viscosity on a Brookfield viscometer at two different rates of shear as measured by the speed of rotation of the spindle immersed in the sample. An arbitrary viscosity index can be established by determining the ratio of the viscosity measured at 2.5 r.p.m. to that at 20 r.p.m. By this criterion, it has been established that in practicing this invention a viscosity index of about 2.0, is necessary for the production of precise images to close tolerances by silk screening, and the generally more desirable useful range is 2.5 to 9, the preferred range being 3.5 to 7.0

When conformal coatings are applied to printed circuit boards, it is frequently necessary to leave certain areas uncoated so that solder connections can be made or for other reasons. The pattern formed by the uncoated areas very often must conform to rigid measurement tolerances to comply with the engineering requirements of the part. One very precise and reproducible way to apply a coating in the form of a design within very rigid tolerances is by the technique known as silk screening. In this process the screen which may be made of silk, metal or plastic fibers woven to form a very fine mesh, bearing a pattern of the areas to be uncoated on the substrate, formed by a photoresist on the screen, is accurately positioned over the substrate to be coated, and the coating is forced through the screen onto the substrate by use of a squeegee. In this way the coating is applied to the areas of the substrate not covered by the photoresist on the screen. In the miniaturization of electronic circuitry the printed circuit boards involved are sometimes very small, and the uncoated areas may be lines only a few thousandths of an inch wide or other configurations with tolerances within a few thousandths of an inch. It is therefore necessary when the coating is applied and cured that the flow is negligible so that the tolerances of the configurations of the uncoated areas can be maintained within a few thousandths of an inch.

An object of this invention is to provide an electrical grade coating with specific characteristics which makes it useful in silk screening processes for applying designs within very close measurement tolerances to substrates. Another object of this invention is to provide such a coating with good adhesion to copper laminated printed circuit boards using epoxy-glass inter-layer or other substrate for the board. Another object is to provide such a coating which shows substantially no flow upon curing at elevated temperature.

Another object of the invention is to provide a new method for silk screening for the production of laminated structures, especially printed circuitry, according to the general method described as silk screening.

Another object of the invention is to produce a polyurethane-urea coating system having highly desirable thixotropic characteristics.

Broadly described, the coating systems of this invention are produced by the bringing together of (1) a polyisocyanate adduct,
(2) a free isocyanate monomeric material,
(3) a hindered aromatic diamine, and
(4) a polyol, all more fully hereinafter described. In practice, these are combined in a solvent system. These materials are combined (1) under particular temperature conditions, such having an important bearing upon "pot life" of the resulting mixture, and (2) they are combined according to a specified technique whereby to assure the development of their important thixotropic nature.

The polyisocyanate adduct and the monomeric isocyanate materials are usually in practice employed as a single component in solution. This component may be prepared by a variety of methods. Thus, the desired amount of monomeric material may be added to the adduct, or, since the adduct may be a reaction product involving the monomeric free isocyanate material, the latter may be included in the adduct reaction in an amount in excess of that needed to form the adduct and sufficient to supply the monomeric needs of the component for purposes of this invention.

As to the aforesaid diamine and the polyol, certain procedures have been found important to observe whereby to produce systems having significant thixotropic characteristics. It has been discovered to be important that the diamine be present in the reacting system at an early stage. Thus, it may be supplied to the reaction (1) as the first ingredient added to the adduct-free isocyanate component, or vice versa; (2) it may be supplied simultaneously with the polyol; or (3) it may be supplied shortly after the supplying of the polyol, and thereby obtain systems developing thixotropic nature. However, quite curiously and surprisingly, where the polyol is first supplied to the reaction, the diamine not being shortly thereafter also included, the thixotropic system fails to develop as desired. It is thought on the basis of observation heretofore made that the phenomenon of thixotropy results because of a degree of reaction, perhaps a high degree of reaction, between the free isocyanate and the diamine, which if precluded by improper procedures is destroyed. On this basis, it will be understood that the polyol should not be allowed to utilize the free isocyanate and that this is avoided by supplying the diamine immediately. Regardless of theories regarding thixotropy in the system, the ingredients are best combined according to the foregoing procedures.

As regards the solvent of the system, its distribution between the various materials may be as desired and is not critical.

With regard to the temperature at which these materials interact to produce the desired systems, as a practical matter about 25° C. is optimum. Temperatures of the reacting system is significant primarily in relation to the rates of the reactions which are occurring. Lower temperature slow the rate of development of the basic thixotropic mass, which later cures to its final polymeric state. Higher temperatures accelerate this same rate and also affects the pot life of the mass. Thus, the reaction mass may be prepared at a lower temperature if desired and await the development of thixotropy for such time as might be desired. In general, however, in employing temperature below about 10° C., while useable according to this invention, no particular advantage has been found to accrue. On the other hand, temperatures above 60° C. present problems in that pot life, becomes too short, in the absence of polymerization inhibitors, to be practical. Moreover, some polymerization inhibitors are destructive of desirable characteristics of the coating.

The coating systems of this invention are made by mixing two components in prescribed ratios preferably at about 25° C. The objects of the invention are accomplished by providing two components which when mixed in the prescribed ratio at about 25° C. produce within a few minutes a smooth thixotropic paste which has the specific requirements for producing a pattern to extremely close tolerances by a silk screening process and has a working life of about fifteen to thirty minutes. The smooth thixotropic paste has a short battery consistency with no tendency toward being stringy when made by the method of this invention. Many attempts to make a non-stringing paste suitable for silk screeing by other isocyanate reaction processes were futile. The non-stringing quality is necessary for silk screening. Furthermore, the thixotropic paste when heated to an elevated temperature of about 80° to 170° C. to effect a rapid cure when in the form of a conformal coating, cures to form a polyurethane-urea film which has excellent adhesion to the substrate and has negligible flow thus preserving the exact desired configuration of the pattern to very close tolerances. The coating will also cure at room-temperature, but temperatures in the range of about 125° to 170° C. are more desirable from the practical aspect of speeding up the process. In fact a room temperature cure takes of the order of days to achieve the same degree of solvent resistance and moisture protection as is obtained at 125° C. in one hour or at 170° C. in 30 minutes. Thus the necessity for a non-flowing characteristic with a high temperature cure is recognized from a practical standpoint.

As aforesaid the adduct-free isocyanate component is referred to as a solution. In preparing these solutions the adduct-free isocyanate content may vary widely. The basic criteria involve consistency of the resulting solution. Thus where the solution is highly concentrated, it becomes more viscous and more difficult to handle. Overly delute solutions are difficult to utilize in producing images of the desired fidelity. However, no other criterion is necessary to be accounted for. A practical range of the isocyanate bearing materials has been found to be about 60–90% by weight.

Having the foregoing in mind, and in the interest of simplicity for descriptive purposes, the invention will be discussed hereinafter in terms of temperatures of about 25° C. and considering the combining of two basic components, i.e., the adduct-free isocyanate mixture and the polyol-diamine mixture. Reference to "free-isocyanate" is to be understood as contemplating at least 50% by weight 2,4-toluylene diisocyante.

One component of the coating system of this invention is described as an isocyanate adduct and free isocyanate monomer, specifically toluylene diisocyanate comprising the 2,4-isomer in at least 50% in solution in a mixture of solvents. The adduct is a polyurethane polyisocyanate of the types described in U.S. Patent 2,969,386 wherein the isocyanate is toluylene diisocyanate. The preferred adduct is the reaction product of two equivalents of toluylene diisocyanate consisting of about 80 parts of the 2,4-isomer and 20 parts of the 2,6-isomer and one equivalent of a polyhydric alcohol consisting of 70 parts of trimethylolpropane and 30 parts of 1,3-butylene glycol. The free isocyanate monomer is toluylene diisocyanate. The adduct is made by the process described in U.S. Patent 2,969,386. An alternate method is to make the adduct directly in the solvents. The solvents are liquids non-reactive with isocyanates. While a wide variety of solvent blends are envisioned as being useful and are in fact so, those which have been found to be particularly advantageous are xylene, Cellosolve acetate and butyl Cellosolve acetate.

The amount of free toluylene diisocyanate monomer may be varied; however, the 2,4-toluylene diisocyanate isomer content is important in obtaining the proper thixotropic character of the coating system. The number of equivalents of 2,4-toluylene diisocyanate monomer in the isocyanate component of the coating system should be at least about equal to the number of equivalents of aromatic diamine used in the active hydrogen-bearing component of the system which is the second component. A practical range of 2,4-toluylene diisocyanate content to use is about one to three equivalents per equivalent of aromatic diamine in the second component and the preferred ratio range is about 1.6 to 2.3. As is well known, free isocyanate materials are commonly supplied as isomeric mixtures and in using these, the preferred range of isomer ratios in the free toluylene diisocyanate monomer content is about 50 to 80% 2,4-isomer and 50 to 20% 2,6-isomer.

The total solids of the isocyanate-bearing component in its solvent may also be varied by those skilled in the art. A practical range of total solids content including the free toluylene diisocyanate monomer is about 60 to 90% by weight.

The thickness of the coating which can be applied in one coat depends upon the total solids content of the system. Using an isocyanate-bearing component containing 60.7% solids produces a coating about 0.0015 to 0.0025 inches thick and using one containing 76.7% solids produces a coating about 0.003 to 0.005 inch thick per coat.

The second component of the coating system may be described as a solution of a hindered aromatic diamine in a polyol. Hindered aromatic diamines which are suitable have other groups in the molecule which are in positions ortho or adjacent to the amine groups in the aromatic ring. Aliphatic diamines or unhindered aromatic diamines are not suitable because the useful life of the coating system during the application period is too short for use in silk screening. However, if the coating were to be used in other applications where the pot life is not important and the controlled thixotropic character of the system is not important, then diamines other than hindered aromatic diamines might be used. Hindered aromatic diamines, as a class, are envisioned as useful herein. Typical examples of such diamines, and which themselves are suitable, are 3,3′-dichlorobenzidine, 4,4′-methylene-bis (2-chloroaniline), ortho-tolidine and 3,3′-dimethoxybenzidine. The preferred diamine is 4,4′-methylene-bis (2-chloroaniline).

The amount of hindered aromatic diamine to use in the polyol may be varied by those skilled in the art to obtain the desired result. This amount depends upon the exact characteristics of the isocyanate component and the polyol used in the amine-bearing component. Generally speaking, with particular reference to the viscosity characteristics of the final system, the higher the total solids content or viscosity of the isocyanate-bearing component, the lower the diamine content required in the other component. If the amine-bearing component is less viscous in one case than another, as occurs where the polyol of the components produces a lower viscosity, then more diamine will be required in such less viscous component than in the more viscous component when used with the same isocyanate component to achieve roughly the same result. An indication of the preferred amount of diamine is given in the table where the polyol is the preferred polyol described in later paragraphs herein and the isocyanate component made at different total solids contents, is the preferred one as described in earlier paragraphs herein.

Table

| Percent total solids in isocyanate component: | Percent diamine in polyol mixture |
|---|---|
| 60.8 | 16.0 |
| 64.5 | 15.0 |
| 69.8 | 13.5 |
| 76.7 | 12.0 |
| 78.5 | 10.0 |
| 82.2 | 8.7 |
| 90.0 | 7.5 |

Thus, it will be understood that according to this invention the amount of free isocyanate, i.e., toluylene diisocyanate, is determined in relation to the amount of diamine and is supplied in a form affording the 2,4-isomer, preferably, in at least about stoichometric amounts.

Polyols which are suitable to use in the second component have a functionality greater than two and up to about 6 and an equivalent weight in the range of about 150 to 350. They may be of the types generally known as polyethers, polyesters, or polythioethers. The preferred functionality is in the range of about 2.7 to 4.2. In referring to polyols, it is intended that the term includes individual polyhydric compounds and also mixtures of two or more such compounds. The preferred polyols are castor oil derivatives made by ester interchange reaction with polyhydric alcohols such a pentaerythritol, pentahydric alcohols such as arabitol and its isomers, and hexahydric alcohols such as sorbitol and its isomers. It is not necessary to remove the glycerine formed in the interchange reaction. A specific preferred polyol of this type is Castor 1066 having hydroxyl number 280 to 290, acid number 1.3 to 1.9, specific gravity at 25/25° C. 0.978 to 0.983.

Another unexpected result is that the acidity of the system greatly affects the thixotropic character in systems with isocyanate components having less than about 64% solids but has little effect at higher solids content. When the acidity is adjusted in systems with isocyanate components having less than about 64% solids by adding an organic acid to the amine-bearing component to raise the acid number of this component to about 2.5 to 30 then the systems have satisfactory screening characteristics. If the acid number is too low, the thixotropic character breaks down during the silk screening operation and the coating is not satisfactory. The preferred acid number for the amine-bearing component of systems of this type is about 5. Any organic acid may be used to adjust the acidity. This includes the aliphatic and aromatic monobasic, dibasic and tribasic acids. The preferred acid is a liquid dimer acid known as Empol 1018 which has an acid value of 188–196.

It is also found that a surface active agent in the formulation greatly improves the release of small bubbles trapped in the thick coating during the silk screening process. Effective agents to use in the amount of about 0.02 to 0.20% of the total formulation are tributyl phosphate, Celluflex FR–2 and PC 1344.

When the two components of the coating are formulated for use, the amounts of the isocyanate component and the amine-bearing component should be used together so that the ratio of the equivalents of isocyanate to the equivalents of active hydrogen in the polyol plus the diamine is within the range of 0.8 to 1.5, for best result within the range of above 0.98 to 1.3, and specifically preferably of the order of about 1.1. The coating hardens at ratios somewhat less than 1.00, but the properties are somewhat impaired.

The invention is illustrated and clarified by the following examples wherein the ratio of the equivalents of polyol to hindered aromatic diamine is in the range of about 3.5 to 5.

EXAMPLE 1

A curing agent is prepared by mixing one equivalent of Castor 1066 having an hydroxyl number equal to 290 and acid number equal to 1.4 with 0.25 equivalent of 4,4′-methylene-bis (2-chloroaniline).

Three isocyanate components are prepared as follows:

Component A.—An adduct represented by two equivalents of toluylene diisocyanate and one equivalent of a polyol consisting of 70 parts trimethylolpropane and 30 parts of 1,3-butylene glycol is made by the process of U.S. Patent 2,969,386. A solution of this adduct is made in a mixture of solvents consisting of xylene and Cellosolve acetate containing 60% xylene such that the NCO content is 9.5%.

Component B.—This component consists of one isocyanate equivalent of Component A and 0.25 equivalent of toluylene diisocyanate containing 80 parts of 2,4-isomer and 20 parts of 2,6-isomer.

Component C.—This component consists of 0.93 isocyanate equivalent of Component A and 0.32 equivalent of toluylene diisocyanate containing 80 parts of 2,4-isomer and 20 parts of 2,6-isomer.

To 100 parts of each of the Components A, B and C is added the curing agent so that the ratio of NCO to active hydrogen is 1.0, thereafter mixing thoroughly. In the case of Components A and B, the systems do not become thixotropic. In the case of Component C, a smooth thixotropic paste results which produces fine detail in a silk screening process and has substantially no flow when cured at 150° C. and has excellent adhesion to epoxy-glass laminate used for printed circuit boards.

EXAMPLE 2

Curing agent A is prepared by mixing 0.426 equivalent of Castor 1066 having an hydroxyl number of 285 and an acid number of 1.35 with 0.12 equivalent of 4,4′-methylene-bis (2-chloroaniline). Other curing agents are prepared by adjusting the acid number of curing agent A with organic acids as follows:

| Curing agent | Adjusted acid number | |
|---|---|---|
| | Adjusted with azelaic acid | Adjusted with dimer acid Empol 1018 |
| A | 2.4 | ---------- |
| B | 4.0 | ---------- |
| C | 8.5 | ---------- |
| D | 15.9 | ---------- |
| E | 27.0 | ---------- |
| F | ---------- | 2.4 |
| G | ---------- | 3.0 |
| H | ---------- | 5.5 |
| I | ---------- | 8.5 |

An isocyanate component is made by mixing 0.75 equivalent of Component A of Example 1 with 0.50 equivalent of toluylene diisocyanate containing 80 parts 2,4-isomer and 20 parts 2,6-isomer and with 24 parts by weight of butyl Cellosolve acetate.

To 100 parts of the isocyanate component is added in separate containers each of the curing agents in amounts so that the isocyanate to active hydrogen ratio is 1.1, thereafter mixing thoroughly. In the case of curing agent A, the coating system does not retain a stable thixotropic character during the silk screening process. In the cases of curing agents G and F, the results are marginal. In the other cases, the coating systems retain a stable thixotropic character and are useful for silk screening for 15 to 30 minutes. The unstable thixotropic character found with curing agent A is evidenced by a general thinning of the material as it is subjected to mechanical shear on the screen and which does not recover fast enough between sweeps of the squeegee to permit a high fidelity image to be made.

EXAMPLE 3

Curing agents are prepared by mixing 0.447 equivalent of Castor 1066 and hydroxyl number equal to 285 and an acid number equal to 1.5 with 0.09 equivalent of the following diamines.

(A) hexamethylene diamine
(B) methylene dianiline
(C) 3,3′-dichlorobenzidine
(D) ortho tolidine
(E) 3,3′-dimethoxybenzidine
(F) 4,4′-methylene-bis(2-chloroaniline)

An isocyanate component is made as follows. An adduct represented by two equivalents of toluylene diisocyanate and one equivalent of a polyol consisting of 70 parts trimethylolpropane and 30 parts 1,3-butylene glycol is made by the process of U.S. Patent 2,969,386. A solution of this adduct is made containing 13.5% NCO in a solvent consisting of 715 parts xylene, 478 parts Cellosolve acetate, 1130 parts butyl Cellosolve acetate made by Union Carbide Chemical Co. and 9 parts of a surfactant PC 1344 made by Monsanto Co. To 86.6 parts of this solution is added 13.4 parts of toluylene diisocyanate containing 80 parts 2,4-isomer and 20 parts 2,6-isomer.

To 100 parts of the isocyanate component is added in separate containers each of the curing agents in an amount such that the isocyanate to active hydrogen ratio is 1.1, thereafter mixing each thoroughly.

In the case of curing agents A and B, the coating systems cure rapidly and are not thixotropic and useful for silk screening. In the cases of the other curing agents, the reaction is retarded and a thixotropic paste useful in silk screening results. The best result is found with 4,4′-methylene-bis (2-chloroaniline).

In regard to the preferred polycols which are suitable to use in the second component, such material is made by ester interchange by heating 2.22 moles of castor oil of molecular weight about 923 and functionality 2.7 with 0.85 mole of sorbitol until the sorbitol is substantially all reacted. The resulting polyol has a functionality of 3.6 and an hydroxyl equivalent weight of 199. By varying the amount of sorbitol, the functionality and equivalent weight of the product is varied. When 2.0 moles of sorbitol are used with 2.22 moles of castor oil, the product has a functionality of 4.25 and an hydroxyl equivalent weight of 135. When 3 moles of pentaerythritol and 4 moles of castor oil are heated together to effect ester interchange, another polyol of the preferred type is made wherein the functionality is about 3.2 and the hydroxyl equivalent weight about 184. Thus by varying the polyol used in the ester interchange reaction with castor oil from a functionality of about 4 to 6 and the amounts thereof, it is possible to produce modified castor oil polyol mixtures with functionality in the range 2.7 to 6.0 which are the preferred polyols used in the second component herein described in earlier paragraphs.

With regard to the surface active agents which are effective in the coating systems of this invention, a selection may be made over and above those specifically mentioned herein in earlier paragraphs by reference to the classification system for surface active agents found in the publication, Surface Active Agents by Schwarts and Perry 1949, on pages 15 to 17 inclusive. Surface active agents from any of these classes are effective if they are not reactive toward isocyanate or are only slightly reactive in that the rate of reaction is very slow. Compounds containing active hydrogen as measured by the Zerewitinoff Test as described by Kohler in J. Am. Chem. Soc. 49, 3181 (1927) are generally not useful unless the reaction rate toward isocyanate is slow. Groups of this type will ordinarily be —OH, —SH, —NH, —$NH_2$, —$CONH_2$, —$SO_3H$, —$SO_2NH_2$. Alkali metal salts are ordinarily not useful because of their catalytic effect on the coating system. Within this framework selections can be made in Classification I Anionic, Classification III Non-Ionic, Classification V Water-Insoluble Emulsifying Agents and Classification VI Non-Aqueous Systems.

The solvents which have been mentioned as useful in the practice of this invention are diethylene glycol monoethyl ether acetate known as Cellosolve acetate and diethylene glycol monobutyl ether acetate known as butyl Cellosolve acetate.

"Celluflex FR-2" is a tris(dichloropropyl) phosphate. Empol 1018 is a mixture of dimer and trimer acids, the dimer acid predominating in the ratio of about 7:1. There is also a trace of monobasic acids up to a maximum of about 1%. This material has a neutralization equivalent of 287–299, and acid value of 188–196 and a saponification value of 192–198. Basically, the dimer and trimer acids are produced by polymerization of unsaturated $C_{18}$ fatty acids.

What is claimed is:

1. A process for the preparation of a thixotropic composition suitable for silk screening in precise designs and curing without substantial flow comprising combining at a temperature of about 10° C. to 60° C. two components:

(1) one equivalent of an isocyanate component comprising a solution in a non-reactive solvent of an adduct prepared from two equivalents of toluylene diisocyanate and one equivalent of a polyol together with toluylene diisocyanate monomer including the 2,4-isomer in an amount equal to at least 50% by weight of said monomer wherein the ratio of the equivalents of adduct to free monomeric toluylene diisocyanate is in the range of about 1.5 to 3.

(2) about 0.67 to 1.25 equivalents of an active hydrogen-containing component comprising a polyol selected from the group consisting of castor oil and ester interchange polyhydric alcohol derivatives of castor oil, said polyol having a functionality greater than 2 up to about 6 together with a hindered aromatic diamine wherein the ratio of the equivalents of polyol to hindered aromatic diamine is in the range of about 3.5 to 5.

2. A process as claimed in claim 1 wherein the active hydrogen-containing component contains a solvent nonreactive toward isocyanates.

3. A process as claimed in claim 1 wherein the aromatic diamine is methylene bis(2-chloroaniline).

4. A process as claimed in claim 1 wherein the polyol is a polyhydric castor oil derivative made by an ester interchange reaction between castor oil and a polyol selected from the group consisting of pentaerythritol, arabitol and its isomers and sorbitol and its isomers.

References Cited

UNITED STATES PATENTS

| | | | |
|---|---|---|---|
| 3,331,127 | 7/1967 | Kerkhof et al. | |
| 3,226,256 | 12/1965 | Schneble et al. | 117—212 |
| 3,218,348 | 11/1965 | McElroy et al. | 260—33.6 X |
| 3,183,109 | 5/1965 | Neumann et al. | 260—33.6 X |
| 2,955,056 | 10/1960 | Knox | 260—77.5 X |

FOREIGN PATENTS

| | | |
|---|---|---|
| 733,576 | 5/1966 | Canada. |

DONALD E. CZAJA, Primary Examiner

C. WARREN IVY, Assistant Examiner

U.S. Cl. X.R.

117—212; 260—30.6, 31.4, 33.6, 77.5, 859